US010796202B2

(12) United States Patent
Gurghian et al.

(10) Patent No.: US 10,796,202 B2
(45) Date of Patent: Oct. 6, 2020

(54) SYSTEM AND METHOD FOR BUILDING AN EDGE CNN SYSTEM FOR THE INTERNET OF THINGS

(71) Applicant: VIMOC Technologies, Inc., Mountain View, CA (US)

(72) Inventors: Alexandru Gurghian, Palo Alto, CA (US); Aaron James Hector, Santa Clara, CA (US)

(73) Assignee: VIMOC Technologies, Inc., Mountain View, CA (US)

( * ) Notice: Subject to any disclaimer, the term of this patent is extended or adjusted under 35 U.S.C. 154(b) by 201 days.

(21) Appl. No.: 16/137,420

(22) Filed: Sep. 20, 2018

(65) Prior Publication Data
US 2019/0138829 A1    May 9, 2019

Related U.S. Application Data

(60) Provisional application No. 62/561,639, filed on Sep. 21, 2017.

(51) Int. Cl.
*G06K 9/62* (2006.01)
*G06K 9/00* (2006.01)
*H04L 29/08* (2006.01)

(52) U.S. Cl.
CPC ....... *G06K 9/6257* (2013.01); *G06K 9/00979* (2013.01); *G06K 9/6256* (2013.01); *H04L 67/10* (2013.01); *H04L 67/1097* (2013.01); *H04L 67/12* (2013.01); *G06K 2209/23* (2013.01)

(58) Field of Classification Search
None
See application file for complete search history.

(56) References Cited

U.S. PATENT DOCUMENTS

| | | | |
|---|---|---|---|
| 9,696,721 | B1 | 7/2017 | Myers et al. |
| 2013/0262059 | A1 | 10/2013 | Grbovic et al. |
| 2014/0266801 | A1 | 9/2014 | Uppal et al. |

(Continued)

OTHER PUBLICATIONS

U.S. Appl. No. 15/611,691—Office Action dated Jan. 11, 2019, 24 pages.

(Continued)

*Primary Examiner* — Casey L Kretzer
(74) *Attorney, Agent, or Firm* — Haynes Beffel & Wolfeld, LLP; Ernest J. Beffel, Jr.

(57) ABSTRACT

The disclosed technology for building an edge convolutional neural network (CNN) system for IoT includes training on-site processors to analyze image data and identify motorized vehicles, bicycles and people in near-real-time, using a big cloud CNN, a small cloud CNN and an on-site CNN. At least five hundred site-specific images from cameras are analyzed using the big cloud CNN to produce a machine-generated training set that includes an image that has regions, and for each region, coordinates of bounding boxes for objects in the region, and classification of contents of the bounding boxes as a motorized vehicle, bicycle or person; and the training set. The machine-generated training set gets used to train the small cloud CNN; and coefficients from the trained small cloud CNN get transferred to the on-site CNN, thereby configuring the on-site CNN to recognize motorized vehicles, bicycles and people in images from the cameras in near-real-time.

20 Claims, 6 Drawing Sheets

(56) References Cited

U.S. PATENT DOCUMENTS

| | | |
|---|---|---|
| 2017/0234053 A1 | 8/2017 | Myers et al. |
| 2018/0121733 A1* | 5/2018 | Joshi .................. G06K 9/00744 |
| 2019/0012768 A1* | 1/2019 | Tafazoli Bilandi ....... G06T 1/20 |
| 2019/0236411 A1* | 8/2019 | Zhu ...................... G06K 9/6292 |

OTHER PUBLICATIONS

U.S. Appl. No. 15/611,691—Response to Office Action dated Jan. 11, 2019, filed Jul. 11, 2019, 16 pages.
"NeuBox, The Data Utility Computing Node", Vimoc Technologies, www.vimoc.com, Jun. 13, 2016, 6 pages.
Szegedy, "Going deeper with convolutions", arXiv:1409.4842v1, [cs.CV], pp. 1-12, Sep. 17, 2014.
Simonyan, Very Deep Convolutional Networks for Large-Scale Visual Recognition, Visual Geometry Group, Department of Engineering Science, University of Oxford, http://www.robots.ox.ac.uk/-vgg/research/very_deep/, Sep. 7, 2017, pp. 1-3.
Simonyan, "Very Deep Convolutional Networks for Large-Scale Image Recognition", Visual Geometry Group, Department of Engineering Science, University of Oxford, karen,az@robots.ac.uk, arXiv:1409.1556v6, [cs.CV], published as a conference paper at ICLR, Apr. 10, 2015, pp. 1-14.
"Bike/Pedestrian Detection", VIMOC, Mountain View, CA 94040, www.vimoc.com, Jul. 3, 2017, pp. 1-2.
"Smart Parking Solutions, Parking Garage Occupancy Management", VIMOC, Mountain View, CA 94040, www.vimoc.com, Jul. 3, 2017, pp. 1-2.
"Smart Parking Solutions, Individual Space Detection", VIMOC, Mountain View, CA 94040, www.vimoc.com, Jul. 12, 2017, pp. 1-2.
"Crosswalk Pedestrian Detection", VIMOC, Mountain View, CA 94040, www.vimoc.com, Jul. 3, 2017, pp. 1-2.

* cited by examiner

SYSTEM AND METHOD FOR BUILDING AN EDGE CNN SYSTEM FOR THE INTERNET OF THINGS

PRIORITY APPLICATION

This application claims the benefit of U.S. Provisional Patent Application No. 62/561,639, entitled "SYSTEM AND METHOD FOR BUILDING AN EDGE CNN SYSTEM FOR THE INTERNET OF THINGS" filed on 21 Sep. 2017.

RELATED APPLICATIONS

This application is related to U.S. Provisional Application No. 62/345,724, entitled "SENSORY DATA CAPTURE AND PROCESSING FOR THE INTERNET OF THINGS", filed Jun. 3, 2016 and U.S. application Ser. No. 15/611,691 entitled "SENSORY DATA CAPTURE AND PROCESSING FOR THE INTERNET OF THINGS", filed Jun. 1, 2017. The related applications are hereby incorporated by reference herein for all purposes.

STATEMENT REGARDING PRIOR DISCLOSURES BY THE INVENTOR OR A JOINT INVENTOR UNDER 37 C.F.R. 1.77(B) (6)

An edge CNN system for the Internet of Things was featured as a product offering on VIMOC Technologies' website, at least as early as July 2017, prior to filing of this application. The technology disclosed herein was used during January 2017 to train a system delivered for use in the field by a customer in Silicon Valley. The featured product offering and the training for an installation deployed are backed up by cloud based technical features and system programming disclosed herein. The cloud based technical features are not described in the product offering documents and are not discernable from inspecting the equipment deployed in the field. Copies of print outs from the website of the product offering are provided in a contemporaneously filed Information Disclosure Statement, pursuant to the guidance of *Examination Guidelines for Implementing the First Inventor To File Provisions of the Leahy-Smith America Invents Act,* 78 Fed. Reg. 11059, 11076 middle column (Feb. 14, 2013).

BACKGROUND

Computer software has been written for serial computation. To solve a problem, an algorithm is constructed and implemented as a serial stream of instructions. These instructions are executed on a central processing unit on one computer. Only one instruction may execute at a time. After that instruction is finished, the next is executed.

Parallel computing, on the other hand, uses multiple processing elements simultaneously to solve a problem. This is accomplished by breaking the problem into independent parts so that each processing element can execute its part of the algorithm simultaneously with the others. The processing elements can be diverse and can include resources such as a single computing engine with multiple processors, or several networked computing engines, specialized acceleration hardware, or any combination of the above. The result is an increase in efficiency and speed of processing.

There are several inefficiencies in the current parallel-computing-systems-related IoT architecture. IoT computing systems typically require the use of application software that is downloaded on node computing system micro servers within a cloud computing architecture in a data center to achieve efficient workload and sustain the huge amount of data generated from sensory data. For example Kinesis Amazon Web Services rely on hardware micro servers and hardware accelerators within the data center to achieve an efficient throughput. The infrastructure receives raw data from different types of sensors and databases. The growth for data generated from IoT sensors will put huge pressure on the hardware infrastructure and generate a high level of software complexity. IoT deployments will generate large quantities of data that need to be processed and analyzed in real time. Processing large quantities of IoT data in real time will increase as a proportion of workloads of data centers, leaving providers facing new security, capacity and analytics challenges.

Large-scale applications like smart cities involving millions of sensors will lead to software complexity and high costs of management. Furthermore, parallel processing architectures within data centers are complex and inefficient, requiring high-cost software and operational management.

SUMMARY

The disclosed technology for building and edge CNN system for the Internet of Things (IoT) relates to training on-site processors to analyze image data from multiple cameras and identifying motorized vehicles, bicycles and people in near real time. One disclosed method includes using a trio of convolutional neural networks (CNN) running on cloud-based and on-site hardware: a big cloud CNN, a small cloud CNN and an on-site CNN. The small cloud CNN shares structure and coefficients with the on-site CNN: coefficients trained on the small cloud CNN can be transferred to the on-site CNN. The method includes collecting thousands of site-specific images, from cameras, to be analyzed using the big cloud CNN to produce a machine generated training set for training the small cloud CNN. The machine-generated training set includes an image that has regions, and for each region, coordinates of bounding boxes for any motorized vehicles, bicycles or people, the bounding boxes anchored in the region, and classification of contents of the bounding boxes as a motorized vehicle, bicycle or person. The method also includes using the machine generated training set to train the small cloud CNN; and transferring coefficients from the trained small cloud CNN to the on-site CNN, thereby configuring the on-site CNN to recognize motorized vehicles, bicycles and people in images from the cameras.

Particular aspects of the technology disclosed are described in the claims, specification and drawings.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

Vision processing networks require vast computing resources, so do not run on small, inexpensive devices. The disclosed technology makes possible the transfer of the power of big convolutional neural networks (CNN) for vision processing to small CNNs that mimic big CNNs and can run in near real time on small CNN devices. The power-efficient embedded artificial intelligence (AI) computing module makes possible execution speed increases of orders of magnitude and drastically reduced memory requirements, compared to processing the same image at the cloud network.

In one use case for near real time vision processing on small generic edge CNNs, a live street parking system identifies bicycles and pedestrians and provides 24/7 real time data that empowers the city to plan safe routes to school and to warn other road users, such as drivers, to use caution in identified areas. The low latency of the system running in near real time makes the identifications possible. In another use case, images of license plates in a college parking garage are usable to identify license plates and the information can be used for cross-checking with university permit databases, for heightened security of students and for virtual permitting systems. In yet another use case, the identification of vehicles in parking spaces in near real time can be used to guide drivers to available parking spaces and live information in a public garage can be displayed on live high quality LED signs outside the garage to alert drivers to availability of parking.

The disclosed technology utilizes a big neural network to process images collected in the field, identifying objects in the images and generating bounding boxes for objects of interest in the images. Simplifying assumptions about the captured images to be processed make it possible to train a small cloud CNN device using the collected images processed using the big CNN. Assumptions for training include using a camera that is stable in a fixed location and utilizing a consistent viewing angle for the camera. That is, the camera captures images that have the same background and the same viewing angle, unlike images captured with moving cameras mounted on drones or cars or bicycles. For these use cases, overfitting the CNN by learning how to match exact training images to the classes in the field for a very specific application improves accuracy for the near real time identifications.

Figure 1:
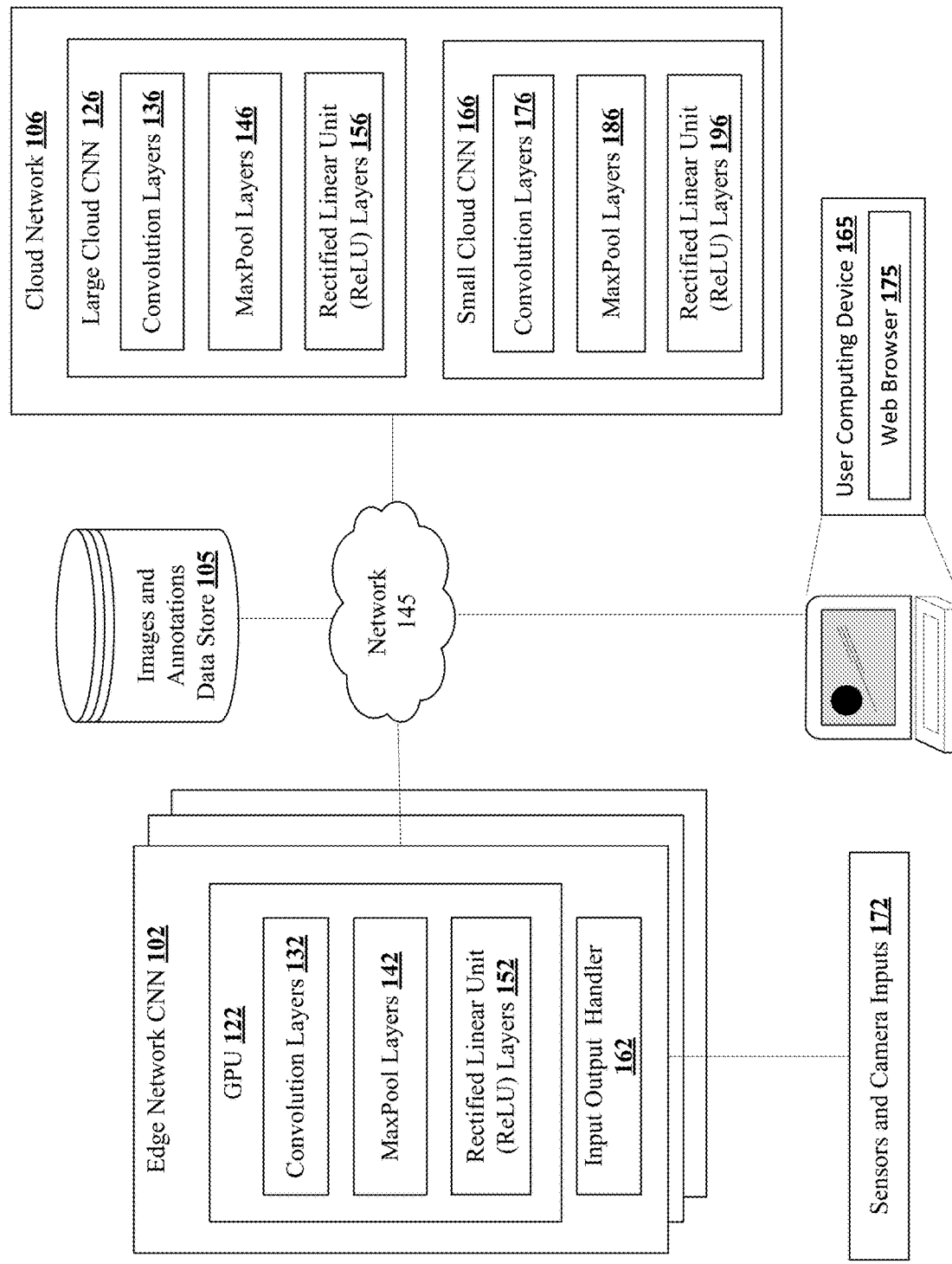
FIG. 1 illustrates a block diagram of an environment for building an edge CNN system for IoT, including training on-site processors to analyze image data from multiple cameras and identify motorized vehicles, bicycles and people in near real time.

FIG. 1 illustrates an environment 100 for building an edge CNN system for IoT, configuring on-site processors to analyze image data captured via multiple cameras and to identify motorized vehicles, bicycles and people in near real time. Environment 100 includes at least one edge network CNN 102 and a cloud network CNN 106, which includes big cloud CNN 126 and small cloud CNN 166. Environment 100 also includes network 145; and can include images and annotations data store 105 for storing captured images and annotations files that describe detection output layers for the images, in some implementations. Environment 100 can further include a user computing device 165 with a web browser 175 for monitoring objects identified in captured images.

Continuing with FIG. 1, big cloud CNN 126 and small cloud CNN 166 each include convolution layers 136, 176, MaxPool layers 146, 186 and rectified linear unit (ReLU) layers 156, 196. The convolution layers 136, 176 include a set of learnable filters which have a small receptive field, and extend through the full depth of the input volume. The network learns filters that activate when it detects some specific type of feature at some spatial position in the input. During the forward pass, each filter is convolved across the width and height of the input volume, computing the dot product between the entries of the filter and the input and producing a 2-dimensional activation map of that filter. MaxPool layers 146, 186 partitions an input image into a set of non-overlapping rectangles and, for each such sub-region, output the maximum, progressively reducing the spatial size of the representation, to reduce the number of parameters and amount of computation in the network. Rectified linear unit (ReLU) layers 156, 196 apply a non-saturating activation function to increase the nonlinear properties of the decision function and of the overall network without affecting the receptive fields of the convolution layer. Big cloud CNN 126 processes captured images to create training data for small cloud CNN 166, regressing bounding box location and class information for objects in the given input image. Small cloud CNN 166 trains, utilizing a powerful computer, on output from big cloud CNN 126—creating bounding boxes around objects and identifying objects in the boxes—and transfers the coefficients resulting from the training to edge network CNN 102, which utilizes a network structure interchangeable with the fixed architecture of small cloud CNN 166.

Further continuing with FIG. 1, edge network CNN 102 includes GPU 122 with convolution layers 132, MaxPool layers 142 and rectified linear unit (ReLU) layers 152 which function as described supra for small cloud CNN 166. Edge network CNN 102 also includes input output handler 162 for handling signals from sensors and camera inputs 172. In some implementations, transmission is via a modular wireless sensor input such as Bluetooth low energy (BlE), ZigBee, LoRa (a low power wide area network for wireless battery operated Things in a regional, national or global network), an Ethernet sensor input, or other input mechanisms commonly used for receiving images.

Continuing with FIG. 1, environment 100 optionally includes user computing device 165 which can be utilized to monitor a remote system that uses edge network CNN 102 via a personal computer, a laptop computer, tablet computer, smartphone or other mobile computing device, personal digital assistant (PDA), digital image capture devices, and the like. In some implementations, user mobile device 165 can be a tablet computer, smartphone or other mobile computing device, personal digital assistant (PDA), digital image capture devices, and the like. User computing device 165 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud-based server in an on premise environment. Web browser 175 can be CHROME™, INTERNET EXPLORER™, FIREFOX™, SAFARI™, OPERA™, and the like. In other implementations, environment 100 may not have the same elements as those listed above and or may have other, different elements instead of, or in addition to, those listed above.

To accommodate image background changes that occur throughout a day, even for a fixed camera, the disclosed technology for pre-training edge network CNN 102 includes recording of training images over time, to capture changes such as sunrise, bright daylight or dim fluorescent lighting, dusk, rain, or other environmental factors that alter the light and the image quality for the particular stationary camera to be used with the specific edge system. To collect the desired 10-20K images needed for training small cloud CNN 166, images can be collected for as long as two hours in one implementation. Big cloud CNN 126 (in one example, 10 GB) is usable to process at least five hundred images and more often 10-20K collected images, identifying objects for collection and placement of bounding boxes as frames for objects of interest in the images. In other implementations, the number of images used to train can be different. In some implementations, retraining can occur. In one example, after a camera lens has been cleaned and other equipment is working accurately, a new set of 10K-20K images can be used to retrain an edge system when conditions change.

Figure 2:
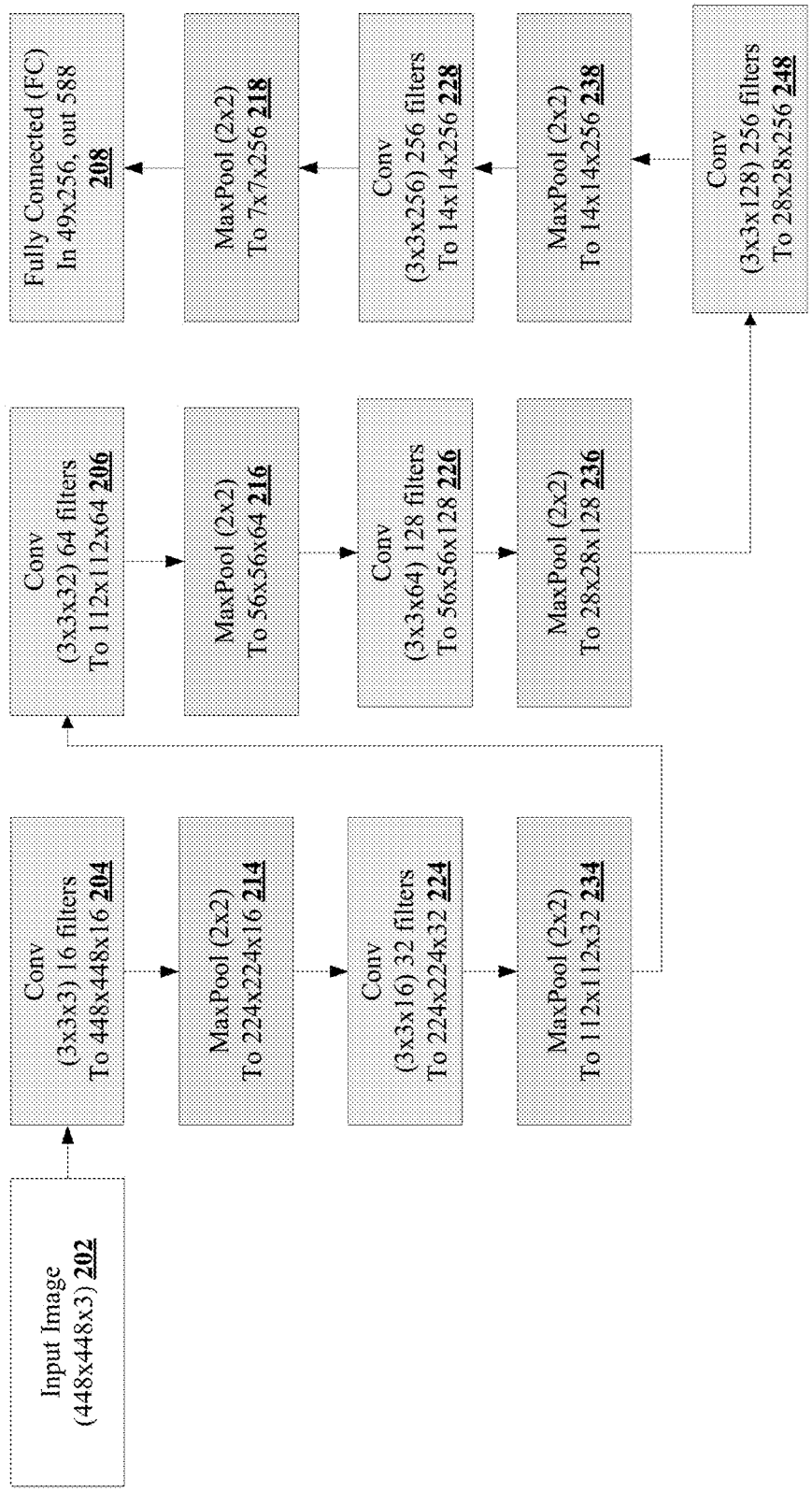
FIG. 2 shows a schematic view of an edge network convolutional neural network (CNN), which processes images to get an output.

FIG. 2 shows a schematic view 200 of an example structure of both small CNN 166 and edge network CNN 102. Small cloud CNN 166 trains using the output of big cloud CNN 126 for a specific camera, computing the coefficients in the cloud for time efficiency, to later run on the edge network. Then, edge network CNN 102 utilizes coefficients from small CNN 166 to process images in near real time. Each convolution step may highlight a vertical edge or a horizontal edge. Network depth makes it possible to identify abstract features. The deeper the network is, the more abstract those features become. MaxPool constrains the size of the information representation and enables the ability to cover the parameter space, forcing the network to find the abstract features.

Edge network CNN 102 passes an input image through a series of convolution layers, pooling layers for down-sampling, and a fully connected layer, to get an output. In one example, edge network CNN 102 receives an input image 202 as pixel values in an array of numbers of resolution and size 448×448×3, in which the 3 refers to RGB values. Each of the array elements is given a value from 0 to 255 to describe the pixel intensity at that point. The first convolution layer 204 outputs the result of sixteen 3×3×3 convolution filters as an array of size 448×448×16. MaxPool (2×2) 214 down samples to size 224×224×16. In the next step, convolution layer 224 outputs the result of thirty-two 3×3×16 convolution filters as an array of size 224×224×32. MaxPool (2×2) 234 down samples to size 112×112×32. In the following step, convolution layer 206 outputs the result of sixty-four 3×3×32 convolution filters as an array of size 112×112×64. MaxPool (2×2) 216 down samples to size 56×56×64. Continuing to the next step, convolution layer 226 outputs the result of one-hundred twenty-eight 3×3×64 convolution filters as an array of size 56×56×128. MaxPool (2×2) 236 down samples to size 28×28×128. In the following step, convolution layer 248 outputs the result of two-hundred fifty-six 3×3×128 convolution filters as an array of size 28×28×256. MaxPool (2×2) 238 down samples to size 14×14×256. In the next step, convolution layer 228 outputs the result of two-hundred fifty-six 3×3×256 convolution filters as an array of size 14×14×256. MaxPool (2×2) 218 down samples to size 7×7×256. Finally, after several convolutional and max pooling layers, the high-level reasoning in the neural network is done via fully connected layers. Neurons in a fully connected layer have connections to all activations in the previous layer, as seen in regular neural networks. In this example, fully connected (FC) 208 layer receives input with dimensions 7×7×256 and outputs 588 values. The 7×7 dimensionality corresponds to 49 areas of the original image. That is, the detection output covers 7×7 potential object locations, predicting object presence and object class.

Edge network CNN 102 creates bounding boxes and recognizes objects within boundary boxes, detecting bounding boxes in the input image with 90-95% accuracy, utilizing the coefficients from small cloud CNN 166. The fully connected (FC) 208 detection output layer outputs at most forty-nine bounding boxes with respective object class, more specifically the x, y, width and height coordinate as well as the class index of the object, as described more fully infra.

Deeper networks give better results. Big cloud CNN 126 is utilized to process collected images, generate bounding boxes for objects of interest in the images, and identify objects in the images. By analyzing the site-specific images using the big cloud CNN to produce a machine generated training set for training the small cloud CNN, with the machine generated training set including an image that has regions, for each region, coordinates of bounding boxes for any motorized vehicles, bicycles or people, the bounding boxes anchored in the region, and classification of contents of the bounding boxes as a motorized vehicle, bicycle or person.

For one implementation, VGG-16 network 116 is a deep convolutional network for object recognition developed and trained by Oxford's renowned Visual Geometry Group (VGG), which achieved very good performance on the ImageNet dataset. It is popular both because it works well and also because the Oxford team has made the structure and the weights of the trained network freely available online. In another implementation, a VGG-19 network could be utilized. In this usage, -16 and -19 refer to the depth of the weight layers of the CNN.

Figure 3:
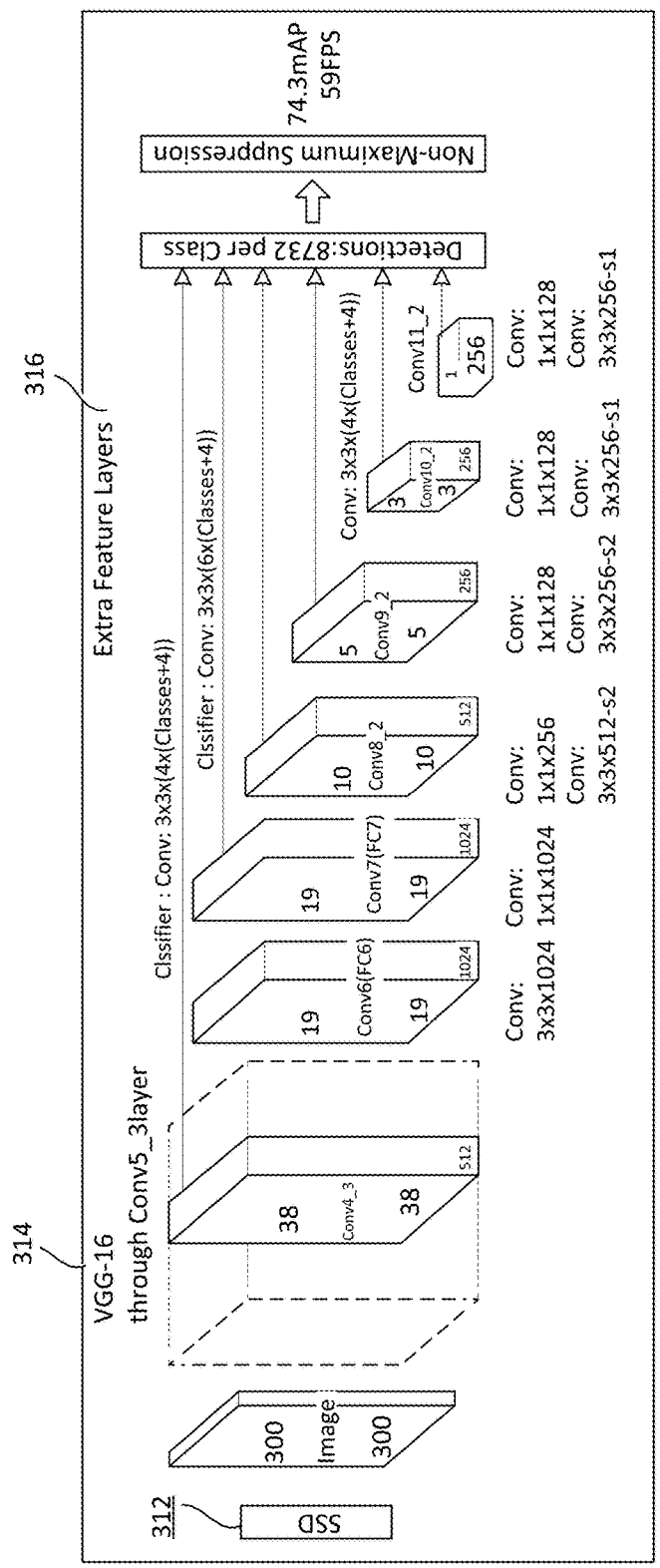
FIG. 3 shows details of a big cloud convolutional neural network usable to process images for training a small cloud network CNN.

FIG. 3 shows details of big cloud network 300, the single shot detector (SSD) 312, which uses the popular VGG-16 network 314 as a base network and adds a detection framework 316 with extra feature layers, which is functionally similar to edge network CNN 102, with the distinction that the edge network executes with far less computational power. The detection framework of cloud network 300 regresses bounding box location and class information for objects in the given input image. VGG-16 network 314 contains around 160M parameters and uses 3×3 convolutions and 2×2 pooling throughout the network. Most of the parameters are consumed in the FC layers.

For building an edge network system for IoT, big cloud network 126 processes at least five hundred images, and more often 10K-20K images captured the field at the site of edge network CNN 102 via sensor and camera inputs 172. The output of big cloud CNN 126 is used to train small cloud CNN 166, which combines convolution layers, MaxPool layers and ReLU layers in a fixed architecture. After the small cloud network CNN 166 is trained, the resulting coefficients are pushed to edge network CNN 102, for recognizing bounding boxes and objects contained in the bounding boxes, in images received in near real time at edge network CNN 102. The on-site CNN combines convolution layers, MaxPool layers and ReLU layers in a network structure interchangeable with the fixed architecture of the small cloud CNN. We describe the annotation files for bounding boxes and objects next.

Annotation files contain training data that describes the detection output layer for an image. In one use case, 10K-20K annotation files, one for each captured image, would be used to train small cloud CNN 166. In one implementation, the output layer outputs at most forty-nine bounding boxes with respective object classes, when a single bounding box is allowed for each processed image. If two bounding boxes are allowed for each region of the image, the output layer would output at most ninety-eight bounding boxes. For each image, the annotation file includes five words of information per bounding box: the object class, the top-left X coordinate of the bounding box of the object, top-left Y coordinate of the bounding box of the object, the width of the bounding box of the object and the height of the bounding box of the object. The coordinates define an anchor for the bounding box, and different coordinate choices can be implemented for different use cases. Example annotation files are listed next.

/home/vimoc/img_1.txt
car 20 45 120 201
person 5 10 50 150
/home/vimoc/img_2.txt
person 20 56 234 334
person 78 6 66 54
car 55 44 33 76

In another use case, such as for counting faces in a crowd, as many as one hundred bounding boxes could be allowed per region, with a resulting increase in computation complexity.

Figure 4:
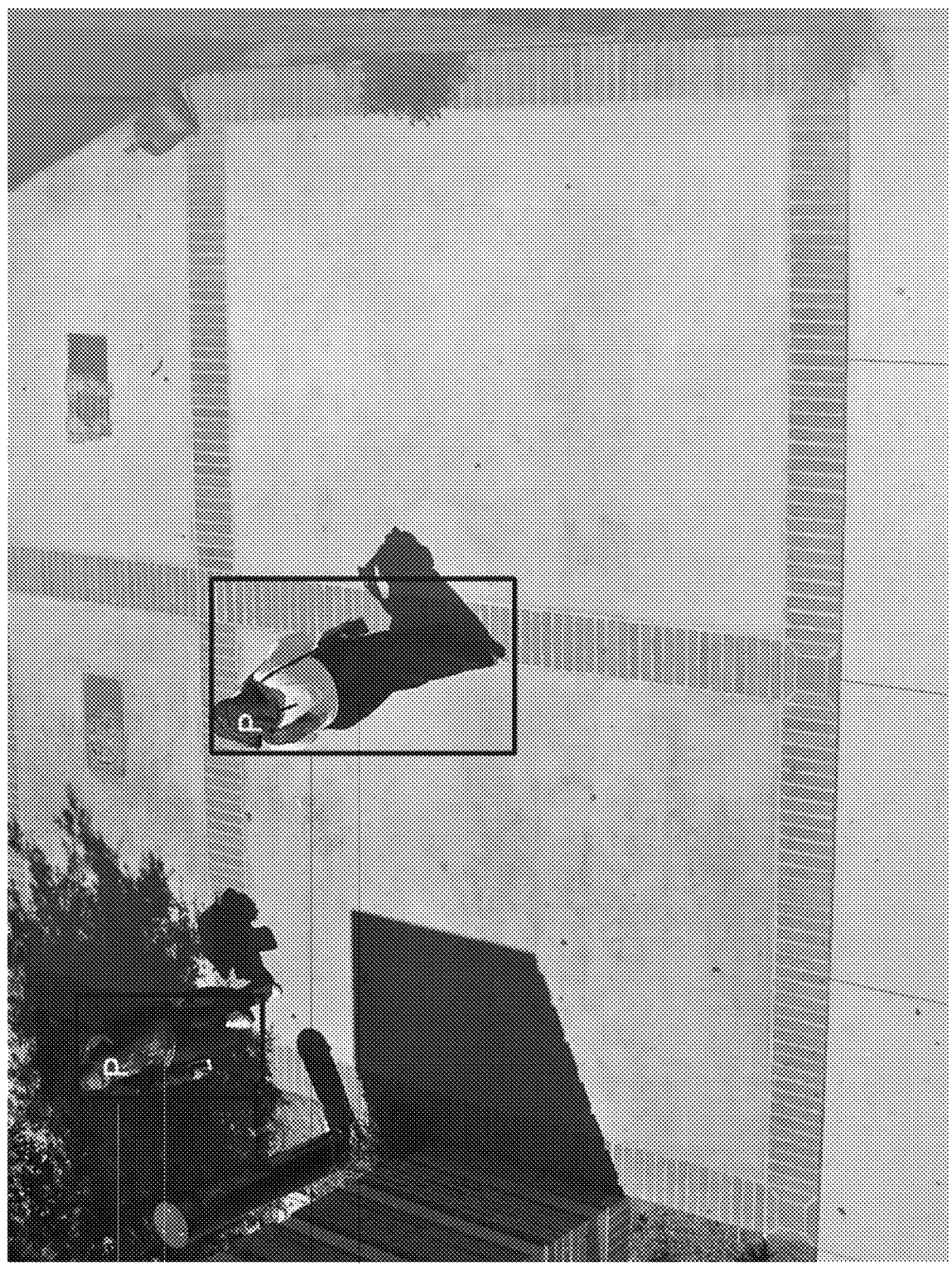
FIG. 4 shows an example image that includes two bounding boxes, each with an object inside the bounding box.

FIG. 4 shows an example image that includes two bounding boxes 412, 442 with a person identified in each of the two bounding boxes, using the edge CNN system for IoT, built as described supra.

The execution speed of the edge network running at the edge will be higher than the execution speed of the cloud network running at the edge would be, with the edge network achieving the same accuracy as the cloud network running at the edge. That is, the disclosed technology for processing an image using the edge network, which utilizes a power-efficient embedded AI computing module, makes possible the same accuracy and execution speed increases of orders of magnitude and drastically reduced memory requirements, compared to processing the same image using the cloud network running at the edge. One example implementation includes a NVidia TX1 module which utilizes 64 MB of memory to process an image in 16 milliseconds (ms), in contrast to the need for 500 MB of memory and 250 ms to process the same image using the cloud network at the edge. Similarly, an implementation that utilizes a NVidia TX2 module processes a single image in approximately 10 ms, in contrast to the same image processed in 156 ms using the cloud network at the edge.

Figure 6:
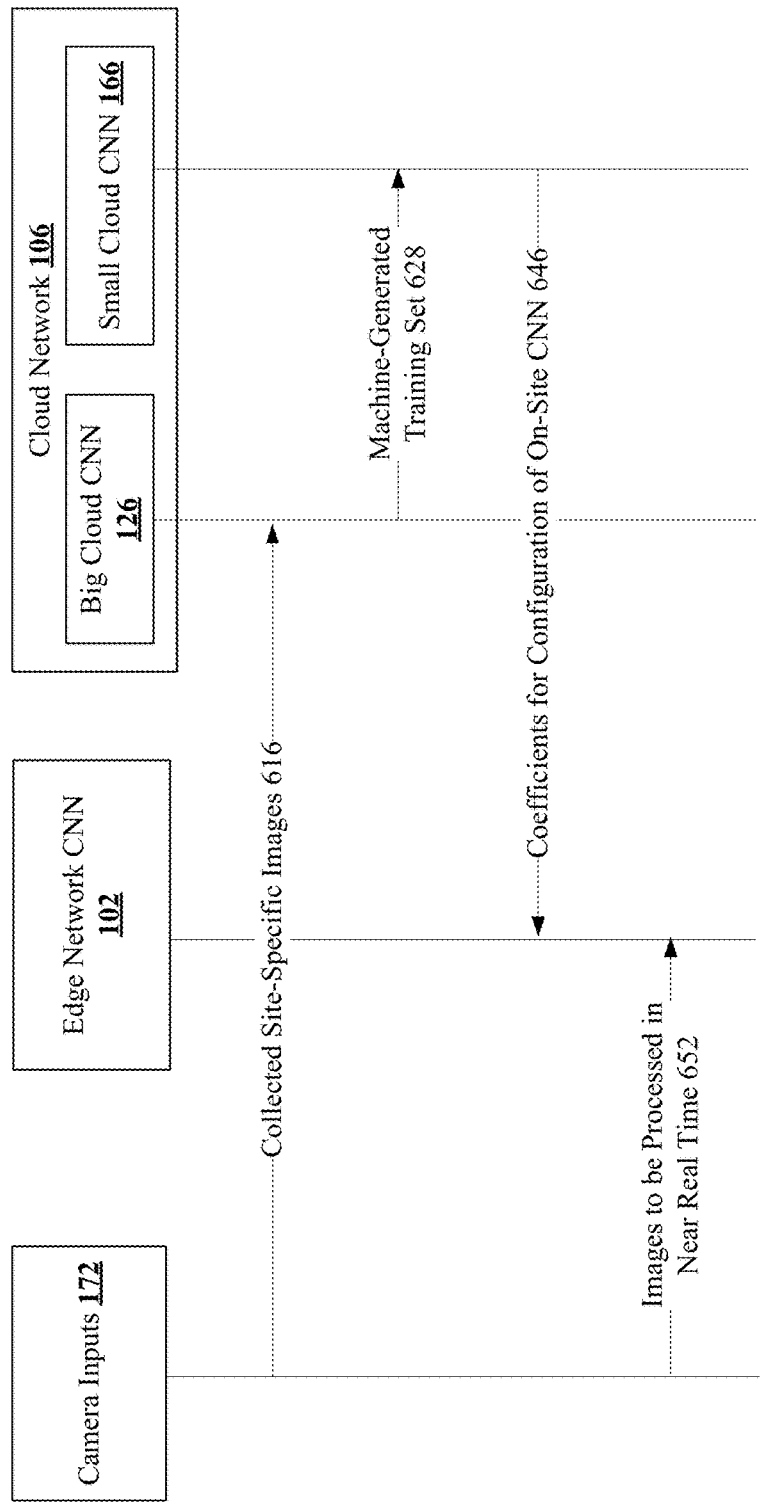
FIG. 6 shows an example message flow for building an edge CNN system for IoT, including training on-site processors to analyze image data from multiple cameras and identify motorized vehicles, bicycles and people in near real time.

FIG. 6 shows the flow for building the edge CNN system for IoT. Camera inputs 172 include at least five hundred, and more often 1000 s of collected site-specific images 616 that are captured and sent to big cloud CNN 126 in cloud network 106. Big cloud CNN 126 generates and transfers the machine generated training set 628 to small cloud CNN 166, also in cloud network 106. The machine generated training set 628 is used to train small cloud CNN 166, and the resulting coefficients for configuration of on-site CNN 646 are sent to edge network CNN 102. After edge network CNN 102 is configured, images to be processed in near real time 652 are received and analyzed at edge network CNN 102 in near real time, using far less memory than would be required if the edge network needed to be trained prior to processing images. The more images the system is trained on, the better the accuracy improvement. In some use cases, some degree of improvement can be achieved even with 100 collected site specific images captured and sent to big cloud CNN.

Computer System

Figure 5:
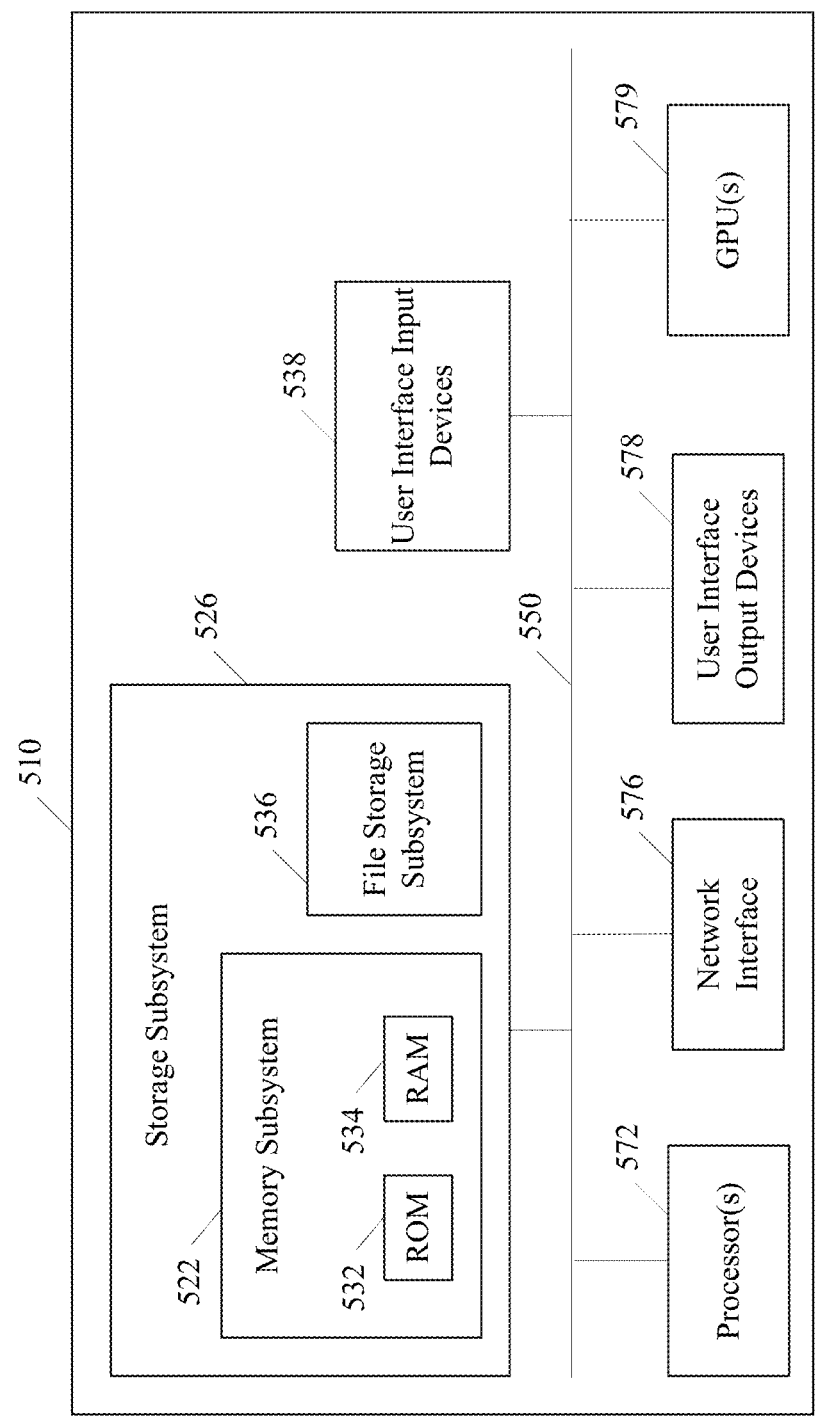
FIG. 5 is a block diagram of an example computer system for building an edge CNN system for IoT.

FIG. 5 is a block diagram of an example computer system 500 for implementing an edge CNN system for IoT. FIG. 5 is a block diagram of an example computer system, according to one implementation. The processor can be an ASIC or RISC processor. It can be an FPGA or other logic or gate array. It can include graphic processing unit (GPU) resources. Computer system 510 typically includes at least one processor 572 that communicates with a number of peripheral devices via bus subsystem 550. These peripheral devices may include a storage subsystem 524 including, for example, memory devices and a file storage subsystem, user interface input devices 538, user interface output devices 576, and a network interface subsystem 574. The input and output devices allow user interaction with computer system 510. Network interface subsystem 574 provides an interface to outside networks, including an interface to corresponding interface devices in other computer systems.

User interface input devices 538 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 510.

User interface output devices 576 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include the possible types of devices and ways to output information from computer system 510 to the user or to another machine or computer system.

Storage subsystem 524 stores programming and data constructs that provide the functionality of some or all of the methods described herein. This software is generally executed by processor 572 alone or in combination with other processors.

Memory 522 used in the storage subsystem can include a number of memories including a main random access memory (RAM) 534 for storage of instructions and data during program execution and a read only memory (ROM) 532 in which fixed instructions are stored. A file storage subsystem 536 can provide persistent storage for program and data files, and may include a hard disk drive, a floppy disk drive along with associated removable media, a CD-ROM drive, an optical drive, or removable media cartridges. The software used to implement the functionality of certain systems may be stored by file storage subsystem 536 in the storage subsystem 524, or in other machines accessible by the processor.

Bus subsystem 550 provides a mechanism for letting the various components and subsystems of computer system 510 communicate with each other as intended. Although bus subsystem 550 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as one example. Many other configurations of computer system 510 are possible having more or fewer components than the computer system depicted in FIG. 5.

Some Particular Implementations

Some particular implementations and features are described in the following discussion.

One implementation of a disclosed method of training on-site processors to analyze image data from multiple cameras and identify transitory objects in near real time includes using a trio of convolutional neural networks (abbreviated CNN) running on cloud-based and on-site hardware: a big cloud CNN, a small cloud CNN and an on-site CNN, wherein the small cloud CNN shares structure and coefficients with the on-site CNN, such that coefficients trained on the small cloud CNN can be transferred to the on-site CNN. The disclosed method also includes collecting hundreds to thousands of site-specific images from cameras to be analyzed by the on-site CNN; analyzing the site-specific images using the big cloud CNN to produce a machine generated training set for training the small cloud CNN. The machine generated training set includes an image that has regions, for each region, coordinates of bounding boxes for any transitory objects, the bounding boxes anchored in the region, and classification of contents of the bounding boxes as a transitory object. The disclosed method further includes using the machine generated training set to train the small cloud CNN; and transferring coefficients from the trained small cloud CNN to the on-site CNN, thereby configuring the on-site CNN to recognize the transitory objects in images from the cameras. Transitory objects move through the scene captured by cameras. The transitory objects are from a set of the transitory objects consisting of people, birds, cats, cows, dogs, horses, sheep, airplanes, bicycles, boats, busses, cars, motorbikes, trains and bicycles. Other transitory objects can also be identified in other use cases.

Another implementation of a disclosed method of training on-site processors to analyze image data from multiple cameras and identify motorized vehicles, bicycles and people in near real time includes using a trio of convolutional neural networks (abbreviated CNN) running on cloud-based and on-site hardware: a big cloud CNN, a small cloud CNN and an on-site CNN, wherein the small cloud CNN shares structure and coefficients with the on-site CNN, such that coefficients trained on the small cloud CNN can be transferred to the on-site CNN. The disclosed method also includes collecting at least five hundred site-specific images from cameras to be analyzed by the on-site CNN; analyzing the site-specific images using the big cloud CNN to produce a machine generated training set for training the small cloud CNN. The machine generated training set includes an image that has regions, for each region, coordinates of bounding boxes for any motorized vehicles, bicycles or people, the bounding boxes anchored in the region, and classification of contents of the bounding boxes as a motorized vehicle, bicycle or person. The disclosed method further includes using the machine generated training set to train the small cloud CNN; and transferring coefficients from the trained small cloud CNN to the on-site CNN, thereby configuring the on-site CNN to recognize motorized vehicles, bicycles and people in images from the cameras.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For one implementation of the disclosed method, the big cloud CNN utilizes a Visual Geometry Group (abbreviated VGG) deep convolutional network architecture to produce the machine generated training set for training the small cloud CNN. In one case, a VGG-16 can be utilized; in another implementation a VGG-19 may be used, with the depth of the convolutional network architecture annotated via the -16 and the -19.

For some implementations of the disclosed method, the small cloud CNN combines convolution layers, MaxPool layers and rectified linear unit (abbreviated ReLU) layers in a first multi-layer convolutional architecture.

For one disclosed method, the on-site CNN combines convolution layers, MaxPool layers and ReLU layers in a network structure interchangeable with the first multi-layer convolutional architecture of the small cloud CNN.

For one implementation of the disclosed method, the machine generated training set includes at least two bounding boxes for a single image. For other implementations, a different number of bounding boxes can be specified, up to one hundred bounding boxes per image, or up to one thousand bounding boxes per image.

For some implementations of the disclosed method, the machine generated training set can be recalibrated when changes occur, responsive to a coefficient update trigger: receiving additional site-specific images from the cameras; analyzing the additional site-specific images using the big cloud CNN to generate an updated machine generated training set; using the updated machine generated training set to retrain the small cloud CNN; and transferring coefficients from the retrained small cloud CNN to the on-site CNN, thereby reconfiguring the on-site CNN to recognize motorized vehicles, bicycles and people in images from the cameras.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the disclosed methods includes one or more processors coupled to memory, that implement any of the methods described earlier.

Computer readable media (CRM) implementations of the technology disclosed include a tangible non-transitory computer readable media impressed with computer program instructions that, when executed on a computer device and one or more servers, enable the computer readable media to interact with a multitude of servers (more than 20) in a custom sensor network, for training on-site processors to analyze image data from multiple cameras and identify motorized vehicles, bicycles and people in near real time, implementing any of the methods described supra.

This CRM implementation and systems disclosed optionally include one or more of the features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of training on-site processors to analyze image data from multiple cameras and identify motorized vehicles, bicycles and people in near real time, the method including:
   using a trio of convolutional neural networks (abbreviated CNN) running on cloud-based and on-site hardware: a big cloud CNN, a small cloud CNN and an on-site CNN, wherein the small cloud CNN shares structure and coefficients with the on-site CNN, such that coefficients trained on the small cloud CNN can be transferred to the on-site CNN;
   collecting at least five hundred site-specific images from cameras to be analyzed by the on-site CNN;
   analyzing the site-specific images using the big cloud CNN to produce a machine generated training set for training the small cloud CNN, wherein the machine generated training set includes
      an image that has regions,
      for each region, coordinates of bounding boxes for any motorized vehicles, bicycles or people, the bounding boxes anchored in the region, and
      classification of contents of the bounding boxes as a motorized vehicle, bicycle or person;
   using the machine generated training set to train the small cloud CNN; and
   transferring coefficients from the trained small cloud CNN to the on-site CNN, thereby configuring the on-site CNN to recognize motorized vehicles, bicycles and people in images from the cameras.

2. The method of claim 1, wherein the big cloud CNN utilizes a Visual Geometry Group (abbreviated VGG) deep convolutional network architecture to produce the machine generated training set for training the small cloud CNN.

3. The method of claim 1, wherein the small cloud CNN combines convolution layers, MaxPool layers and rectified linear unit (abbreviated ReLU) layers in a first multi-layer convolutional architecture.

4. The method of claim 3, wherein the on-site CNN combines convolution layers, MaxPool layers and ReLU layers in a network structure interchangeable with the first multi-layer convolutional architecture of the small cloud CNN.

5. The method of claim 1, wherein the machine generated training set includes at least two bounding boxes for a single image.

6. The method of claim 1, further including, responsive to a coefficient update trigger:
   receiving additional site-specific images from the cameras;
   analyzing the additional site-specific images using the big cloud CNN to generate an updated machine generated training set;
   using the updated machine generated training set to retrain the small cloud CNN; and
   transferring coefficients from the retrained small cloud CNN to the on-site CNN, thereby reconfiguring the on-site CNN to recognize motorized vehicles, bicycles and people in images from the cameras.

7. A system for training on-site processors to analyze image data from multiple cameras and identify motorized vehicles, bicycles and people in near real time, the system including:
   using a system including a trio of convolutional neural networks (abbreviated CNN) running on cloud-based and on-site hardware: a big cloud CNN, a small cloud CNN and an on-site CNN;
   the big cloud CNN is configurable to receive at least five hundred site-specific images from cameras to be analyzed by the on-site CNN and is configured to produce a machine generated training set for training the small cloud CNN, wherein the machine generated training set includes
      an image that has regions,
      for each region, coordinates of bounding boxes for any motorized vehicles, bicycles or people, the bounding boxes anchored in the region, and
      classification of contents of the bounding boxes as a motorized vehicle, bicycle or person;
   the small cloud CNN is trainable, using the machine generated training set, to recognize motorized vehicles, bicycles and people in images from the cameras;
   the on-site CNN shares structure and coefficients with the small cloud CNN, such that coefficients trained on the small cloud CNN can be transferred to the on-site CNN; and
   the on-site CNN is configurable with the coefficients trained on the small cloud CNN to receive and analyze the images from the cameras as they are received.

8. The system of claim 7, wherein the big cloud CNN utilizes a Visual Geometry Group (abbreviated VGG) deep convolutional network architecture to produce the machine generated training set for training the small cloud CNN.

9. The system of claim 7, wherein the small cloud CNN combines convolution layers, MaxPool layers and rectified linear unit (abbreviated ReLU) layers in a first multi-layer convolutional architecture.

10. The system of claim 9, wherein the on-site CNN combines convolution layers, MaxPool layers and ReLU layers in a network structure interchangeable with the first multi-layer convolutional architecture of the small cloud CNN.

11. The system of claim 7, wherein the machine generated training set includes at least two bounding boxes for a single image.

12. The system of claim 7, further including, responsive to a coefficient update trigger:
receiving additional site-specific images from the cameras;
analyzing the additional site-specific images using the big cloud CNN to generate an updated machine generated training set;
using the updated machine generated training set to retrain the small cloud CNN; and
transferring coefficients from the retrained small cloud CNN to the on-site CNN, thereby reconfiguring the on-site CNN to recognize motorized vehicles, bicycles and people in images from the cameras.

13. One or more tangible non-transitory computer readable media impressed with computer program instructions that, when executed on a computer device and one or more servers, enable the computer readable media to interact with a plurality of sensors, in a custom sensor network, to carry out a method including:
using a trio of convolutional neural networks (abbreviated CNN) running on cloud-based and on-site hardware: a big cloud CNN, a small cloud CNN and an on-site CNN, wherein the small cloud CNN shares structure and coefficients with the on-site CNN, such that coefficients trained on the small cloud CNN can be transferred to the on-site CNN;
collecting at least five hundred site-specific images from cameras to be analyzed by the on-site CNN;
analyzing the site-specific images using the big cloud CNN to produce a machine generated training set for training the small cloud CNN, wherein the machine generated training set includes
an image that has regions,
for each region, coordinates of bounding boxes for any motorized vehicles, bicycles or people, the bounding boxes anchored in the region, and
classification of contents of the bounding boxes as a motorized vehicle, bicycle or person;
using the machine generated training set to train the small cloud CNN; and
transferring coefficients from the trained small cloud CNN to the on-site CNN, thereby configuring the on-site CNN to recognize motorized vehicles, bicycles and people in images from the cameras.

14. The one or more tangible non-transitory computer readable media of claim 13, wherein the big cloud CNN utilizes a Visual Geometry Group (abbreviated VGG) deep convolutional network architecture to produce the machine generated training set for training the small cloud CNN.

15. The one or more tangible non-transitory computer readable media of claim 13, wherein the small cloud CNN combines convolution layers, MaxPool layers and rectified linear unit (abbreviated ReLU) layers in a first multi-layer convolutional architecture.

16. The one or more tangible non-transitory computer readable media of claim 15, wherein the on-site CNN combines convolution layers, MaxPool layers and ReLU layers in a network structure interchangeable with the first multi-layer convolutional architecture of the small cloud CNN.

17. The one or more tangible non-transitory computer readable media of claim 13, wherein the machine generated training set includes at least two bounding boxes for a single image.

18. The one or more tangible non-transitory computer readable media of claim 13, further including, responsive to a coefficient update trigger:
receiving additional site-specific images from the cameras;
analyzing the additional site-specific images using the big cloud CNN to generate an updated machine generated training set;
using the updated machine generated training set to retrain the small cloud CNN; and
transferring coefficients from the retrained small cloud CNN to the on-site CNN, thereby reconfiguring the on-site CNN to recognize motorized vehicles, bicycles and people in images from the cameras.

19. A method of training on-site processors to analyze image data from multiple cameras and identify transitory objects in near real time, the method including:
using a trio of convolutional neural networks (abbreviated CNN) running on cloud-based and on-site hardware: a big cloud CNN, a small cloud CNN and an on-site CNN, wherein the small cloud CNN shares structure and coefficients with the on-site CNN, such that coefficients trained on the small cloud CNN can be transferred to the on-site CNN;
collecting at least five hundred site-specific images from cameras to be analyzed by the on-site CNN;
analyzing the site-specific images using the big cloud CNN to produce a machine generated training set for training the small cloud CNN, wherein the machine generated training set includes
an image that has regions,
for each region, coordinates of bounding boxes for any transitory objects, the bounding boxes anchored in the region, and
classification of contents of the bounding boxes as a transitory object;
using the machine generated training set to train the small cloud CNN; and
transferring coefficients from the trained small cloud CNN to the on-site CNN, thereby configuring the on-site CNN to recognize the transitory objects in images from the cameras.

20. The method of claim 19, wherein the transitory objects are from a set of the transitory objects consisting of people, birds, cats, cows, dogs, horses, sheep, airplanes, bicycles, boats, busses, cars, motorbikes, trains and bicycles.

* * * * *